(12) United States Patent
Bothner

(10) Patent No.: US 6,825,459 B2
(45) Date of Patent: Nov. 30, 2004

(54) DUAL COMPENSATED CHLORINE LOGGING TOOL

(75) Inventor: Ronald E. Bothner, Lafayette, LA (US)

(73) Assignee: Weatherford/Lamb, Inc., Houston, TX (US)

(*) Notice: Subject to any disclaimer, the term of this patent is extended or adjusted under 35 U.S.C. 154(b) by 74 days.

(21) Appl. No.: 09/949,596

(22) Filed: Sep. 10, 2001

(65) Prior Publication Data

US 2002/0014583 A1 Feb. 7, 2002

Related U.S. Application Data

(63) Continuation-in-part of application No. 09/225,029, filed on Jan. 4, 1999.

(51) Int. Cl.[7] .................................................. G01V 5/10
(52) U.S. Cl. .................... 250/269.6; 250/256; 250/265; 250/266; 250/269.1; 250/269.7; 376/165
(58) Field of Search .............................. 250/269.6, 256, 250/265, 266, 269.1, 269.7; 376/165

(56) References Cited

U.S. PATENT DOCUMENTS

| | | | |
|---|---|---|---|
| 2,469,461 A | | 5/1949 | Russell |
| 2,469,463 A | * | 5/1949 | Russell ........................ 376/160 |
| 2,782,318 A | | 2/1957 | Herzog |
| 2,862,106 A | | 11/1958 | Scherbatskoy |
| 2,910,591 A | | 10/1959 | Baker |
| 2,933,609 A | | 4/1960 | Norelius |
| 2,949,535 A | | 8/1960 | Scherbatskoy |
| 3,090,867 A | | 5/1963 | Swanson |
| 3,121,164 A | | 2/1964 | Swift |
| 3,147,378 A | | 9/1964 | Hall, Jr. |
| 3,151,242 A | | 9/1964 | Hall, Jr. |
| 3,219,820 A | | 11/1965 | Hall, Jr. |
| 3,240,937 A | | 3/1966 | McKay |
| 3,240,938 A | | 3/1966 | Hall, Jr. |
| 3,244,880 A | | 4/1966 | Owen |
| 3,247,377 A | | 4/1966 | Hall, Jr. |
| 3,265,893 A | | 8/1966 | Rabson |
| 3,413,472 A | | 11/1968 | Caldwell |
| 3,439,165 A | | 4/1969 | Hopkinson |
| 3,532,884 A | | 10/1970 | Dewan |
| 3,772,513 A | | 11/1973 | Hall, Jr. |
| 3,922,541 A | * | 11/1975 | Seeman ........................ 250/256 |
| 3,988,581 A | | 10/1976 | Peelman |
| 4,002,903 A | | 1/1977 | Pitts, Jr. |
| 4,066,892 A | | 1/1978 | Giverns |
| 4,315,417 A | * | 2/1982 | Zarudiansky ................ 62/51.1 |
| 4,404,467 A | | 9/1983 | Schweitzer |

(List continued on next page.)

OTHER PUBLICATIONS

The Shale Compensated Chlorine Log, (SPE4511), P.F. McKinlay and H. L. Tanner, presented at SPE–AIME 1974.

Primary Examiner—Constantine Hannaher
Assistant Examiner—Shun Lee
(74) Attorney, Agent, or Firm—Moser, Patterson & Sheridan

(57) ABSTRACT

A well logging tool has a neutron source for irradiating formation surrounding a borehole. Two detectors are mounted in a spaced-apart vertical relationship within the tool pressure-resistant housing. Each detector detects capture gamma radiation across the entire gamma ray energy spectrum, windows are set in this spectrum to separate two distinct energy ranges, thereby generating a total of four independent sets of signals, two for each detector. One set of signals is indicative of the hydrogen content and insensitive to the chlorine content of the irradiated formation. The second set of signals is indicative of the hydrogen plus the chlorine content of the irradiated formation. By comparing the sets of signals in two proportional energy ranges, the logging tool allows to generate a log that helps determine the presence or absence of hydrocarbon or salt water in the formation.

20 Claims, 9 Drawing Sheets

U.S. PATENT DOCUMENTS

| | | |
|---|---|---|
| 4,645,926 A | 2/1987 | Randall |
| 4,833,320 A * | 5/1989 | Hurlbut ...................... 250/256 |
| 4,918,314 A | 4/1990 | Sonne |
| 5,053,620 A | 10/1991 | McKeon |
| 5,081,351 A * | 1/1992 | Roscoe et al. ........... 250/269.7 |
| 5,097,123 A | 3/1992 | Grau |

* cited by examiner

Fig 2
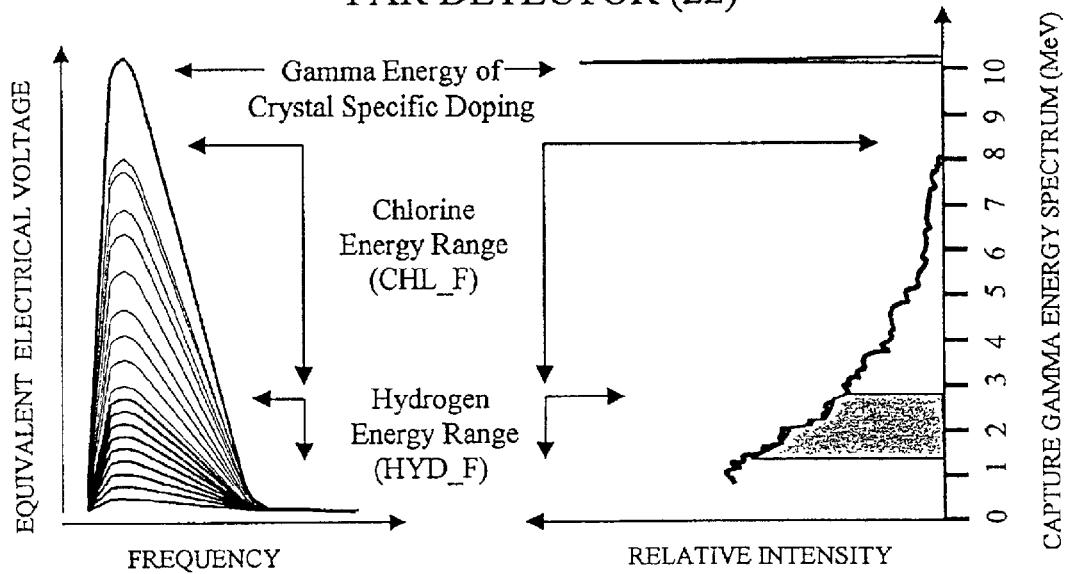
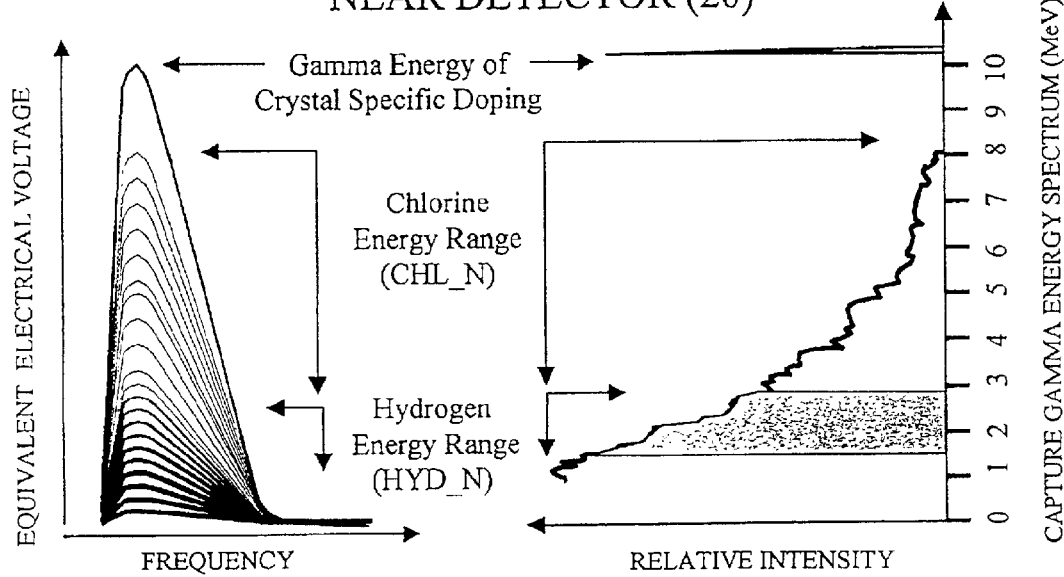

Fig. 6

1. RECORDED VALUES (DATA) FROM THE INVENTION

HYD_N = HYDROGEN_NEAR
CHL_N = CHLORINE_NEAR
HYD_F = HYDROGEN_FAR
CHL_F = CHLORINE_FAR

2. PROPORTIONAL WEIGHTING OF CHL_N TO HYD_N AND CHL_F TO HYD_F VALUES

HYD_N/CHL_N = A; Then compute the average mean value of A over logged interval = a.
CHL_N x a = CHL_NN (Chlorine_Near Normalized)
Note: The values of HYD_N and CHL_NN are not proportionally weighted (equal)

HYD_F/CHL_F = B: Then compute the average mean value of B over logged interval = b.
CHL_F x b = CHL_FN (Chlorine_Far Normalized)
Note: The values of HYD_F and CHL_FN are now proportionally weighted (equal).

3. COMPUTED VALUES (DATA) FROM THE INVENTION

CHL_NN = CHLORINE_NEAR NORMALIZED
CHL-FN = CHLORINE_FAR NORMALIZED

DUAL COMPENSATED CHLORINE LOGGING TOOL

This application is a continuation-in-part of now abandoned U.S. patent application Ser. No. 09/225,029, filed Jan. 4, 1999, and incorporated by reference herein in its entirety.

BACKGROUND OF THE INVENTION

The present invention relates to an apparatus for the determination of the nature of the earth formation by neutron well logging. More particularly, the invention is concerned with improvements in neutron well logging with the use of a pair of substantially identical scintillation or Neutron-Gamma (N-G) detectors having similar function and operation, and each detecting spectral capture gamma radiation representing hydrogen and chlorine for determining the presence of hydrocarbon or salt water in the earth formations traversed by a borehole.

Neutron well logging techniques and methods have been used to analyze earth formations along the traverse of a borehole for over 30 years. Two such techniques and methods used in the prior art for determining the presence of hydrogen and chlorine in a porous earth formation are embodied and accomplished as set forth in U.S. Pat. No. 3,219,820 and U.S. Pat. No. 3,772,513. Both patents are primarily concerned with acquiring a radioactive measurement indicative of hydrogen, formation reference signal (H signal) or (FR) signal which is substantially insensitive to chlorine in the formation; and hydrogen plus chlorine, formation reference signal plus chlorine signal (H+Cl signal) or (FR+Cl) signal which is sensitive to chlorine in the logged formation as well as being indicative of hydrogen. By comparing these measurements relative to the respective embodied patents, both techniques and methods could be used to determine the presence of hydrocarbon or salt water in a porous formation.

It is an object of the present invention to provide improvements in the methods and apparatus disclosed in the two aforementioned patents, particularly the spectral capture gamma method in that of U.S. Pat. No. 3,772,513. It is also the object of the present invention to provide an improved well logging apparatus directed towards spectral determination of hydrogen and chlorine of earth formations for the subsequent determination of the presence of hydrocarbon or salt water in a porous formation traversed by a borehole by utilizing two substantially identical N-G detectors. The detectors are insensitive to adverse effects of certain other interfering elements, which may be present in the earth formation and borehole, and can be used for lithology differentiation of the earth formations.

SUMMARY OF THE INVENTION

The present invention involves improvements in neutron well logging methods and apparatus, which may be embodied in a logging system comprising an instrument, which includes a neutron source for irradiating earth formations as it is passed along the borehole. Spaced at predetermined distances from the source in the instrument along the longitudinal axis of the borehole, there are two substantially identical N-G detectors, each detecting an aggregate capture gamma radiation spectrum from the adjacent formation. The arrangement of the two N-G detectors with respect to distance from the source designates the closest N-G detector as the Near detector and the other N-G detector as the Far detector.

The aggregate capture gamma radiation spectrum from each N-G detector is simultaneously proportioned within two separate predetermined energy ranges, one of which, referred to as Hydrogen or formation reference signal, is indicative of hydrogen and insensitive to chlorine in the formation, and the other of which, referred to as Chlorine or formation reference plus chlorine signal, is indicative of both hydrogen and chlorine in the adjacent formation. The two N-G detector arrangement with respect to distance from the source designates the proportioned energy ranges for the aggregate capture gamma radiation spectrum from the closest N-G detector as Hydrogen Near and Chlorine Near; and the proportioned energy ranges of the other aggregate capture gamma radiation spectrum from the other N-G detector as Hydrogen Far and Chlorine Far.

Surrounding each of the N-G detectors, there is provided a shield of selected material having a high capture cross-section for neutrons and characterized by having a significant thermal neutron induced (capture) gamma radiation energy response within the predetermined Hydrogen energy range of the aggregate spectra of both N-G detectors and having an insignificant gamma radiation energy response within the predetermined Chlorine energy range of the aggregate spectra of both N-G detectors. The selected material of the shield and the functionality of the shield are explained in U.S. Pat. No. 3,772,513 and other preferred embodiments.

Accordingly, since the apparatus of this present invention uses a pair of substantially identical N-G detectors having substantially identical function and operation, each surrounded by substantially identical shields, then the neutron source to detector spacing introduces, in the borehole and earth formations, differing neutron flux in the vicinity of the differently spaced N-G detectors adjacent to the earth formations. It is the object of the present invention to utilize Hydrogen Near, Chlorine Near, Hydrogen Far, and Chlorine Far with respect to the aforementioned differences to give an indication of hydrocarbon or salt water in earth formations traversed by a borehole. It is also the object of this invention to utilize Hydrogen Near, Chlorine Near, Hydrogen Far, and Chlorine Far with respect to the aforementioned differences to give an indication of lithology differentiation in earth formations traversed by a borehole.

It is also the object of the present invention to record Hydrogen Near, Chlorine Near, Hydrogen Far, and Chlorine Far data, in the apparatus, to memory as a function of radiation intensity with respect to time that is later retrieved at the surface along with the apparatus.

BRIEF DESCRIPTION OF THE DRAWINGS

Reference will now be made to the drawings, wherein like parts are designated by like numerals, and wherein

FIG. 2 is a representation of electrical voltages generated internally in the logging apparatus from the Far N-G detector and the Near N-G detector that are proportional and equivalent to the capture gamma radiation energy striking each of the detectors.

FIG. 6 is the mathematical representation for proportionally weighting (normalizing) the Chlorine data to the Hydrogen data for each detector in accordance with the invention.

DETAILED DESCRIPTION OF THE PREFERRED EMBODIMENT

Figure 1:
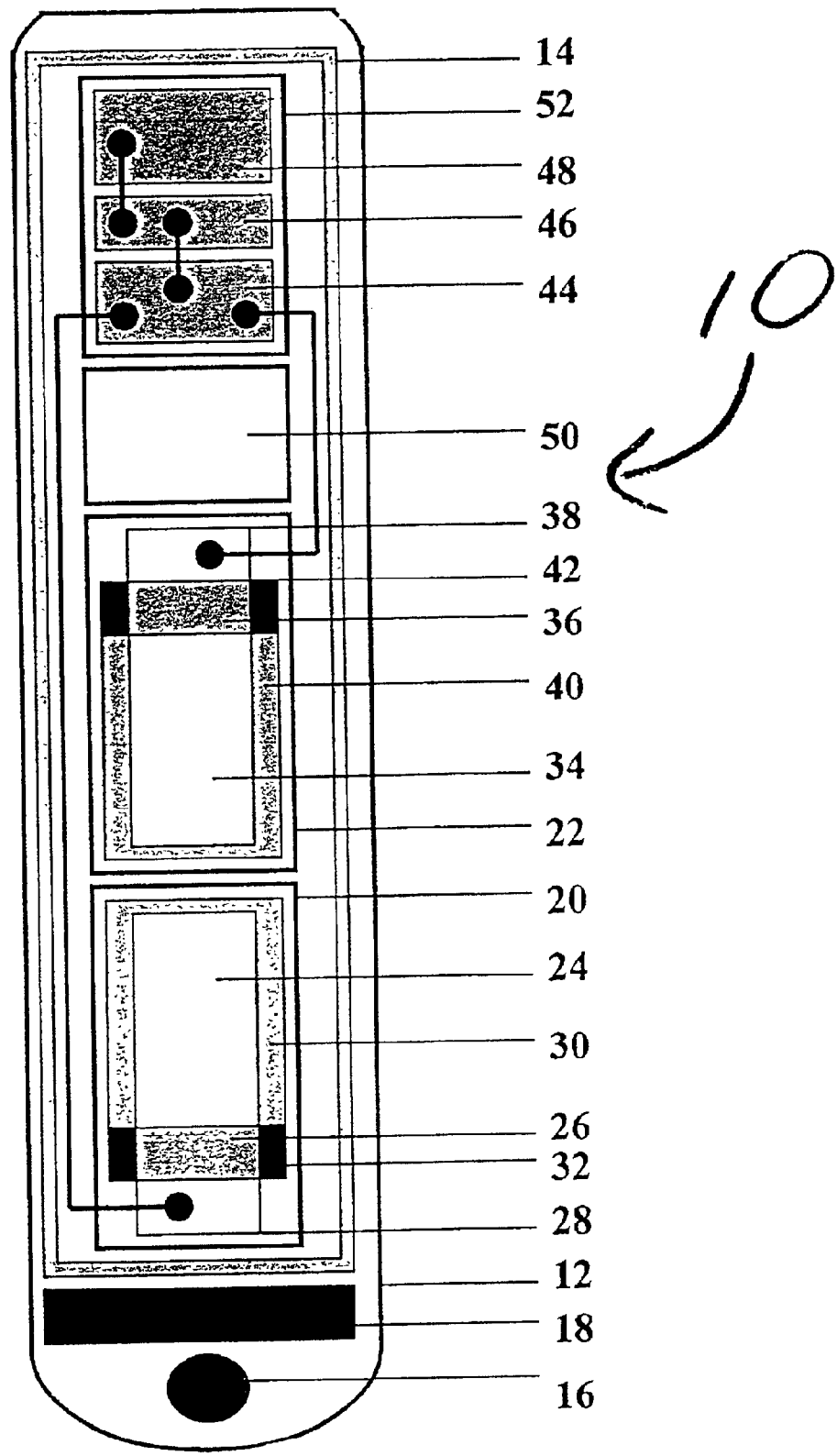
FIG. 1 is a schematic view of the well logging apparatus in accordance with the present invention.

Turning now to FIG. 1, numeral 10 designates the well logging apparatus or tool in accordance with the present invention. An elongated housing 12 adapted for lowering into a borehole to a desired depth of a subterranean formation. It is preferred that the housing 12 be made from a pressure resistant and rust resistant material, for example a high strength alloy that resist elemental compounds such as $H_2S$ and $CO_2$.

Mounted inside the housing 12 is an insulated chamber 14 made in the form of a Dewar flask that extends through substantially the entire length of the housing 12. A source of neutrons 16 is mounted in the housing 12 below the Dewar flask 14. The neutron source 16 continuously emits neutrons, either by a spontaneous or artificially induced nuclear reaction, in the range of about 4–5 MeV. The radioactive process can be activated by a chemical reaction, such as by americium and beryllium, or by a down-hole nuclear accelerator. The preferred activity of the neutron source 16 is at least 18 curies emitting fast neutrons at a rate of 4E+07 per second or higher.

The neutrons emitted from the source 16 pass through the housing wall, the fluid, such as drilling mud, produced liquids and gases, completion liquids, the tubing and/or casing, and cement in the borehole which jointly are in combinations with one another or for this embodiment considered as the borehole component. The neutrons diffuse throughout the borehole component and the earth formations at different levels. This neutron population distribution or flux depends on the borehole component and the earth formations' porosity, salinity, and matrix material.

The diffusing epithermal neutrons collide with various elements, such as hydrogen, chlorine, oxygen, iron, etc. of the borehole component and the earth formations. They are slowed down, thermalized, and are then captured by the elements of the borehole component and the earth formations. The neutron capture by the constituent elements of the borehole component and earth formations results statistically in emissions by each element of its characteristic spectrum (energies) of capture gamma radiation. The statistical sample of this gamma radiation striking each of the N-G detectors 20 and 22 in the tool results in an aggregate spectrum, from each N-G detector 20 and 22, of capture gamma intensity (i.e. rate of occurrence) representing the assorted contributing elements. The arrangement of the two N-G detectors with respect to distance from the neutron source 16 designates the closest N-G detector 20 as the Near detector and the other N-G detector 22 as the Far detector.

In FIG. 2, the aggregate capture gamma radiation spectrum from the Near N-G detector 20 and the Far N-G detector 22 are, each simultaneously proportioned within two separate energy ranges, one of which, referred to as Hydrogen or formation reference signal, is indicative of hydrogen and insensitive to chlorine in the adjacent earth formation, and the other of which, referred to as Chlorine or formation reference signal plus chlorine signal, is indicative of both hydrogen and chlorine in the adjacent earth formation. The two proportioned energy ranges of the aggregate capture gamma spectrum for the Near detector 20 are designated Hydrogen Near (HYD_N) and Chlorine Near (CHL_N). The two proportioned energy ranges of the aggregate capture gamma spectrum for the Far detector 22 are designated Hydrogen Far (HYD_F) and Chlorine Far (CHL_F).

Turning again to FIG. 1, surrounding each of the N-G detectors 20 and 22, there is provided a, substantially identical, shield 30 and 40 of rare earth material having a high capture cross-section for neutrons and characterized by having a significant thermal neutron induced (capture) gamma radiation energy response within the predetermined Hydrogen energy range of the aggregate spectra of both N-G detector 20 and 22; and having an insignificant capture gamma radiation energy response in the predetermined Chlorine energy range of the aggregate spectra of both N-G detectors 20 and 22. For this preferred embodiment, a 99.9% pure samarium foil was used as the shielding material to maximize the diameter of both N-G detectors 20 and 22. Other materials for the shields, 30 and 40, and the functionality of the shields, 30 and 40, are explained in U.S. Pat. No. 3,772,513 and other preferred embodiments. As explained in the aforementioned patent, the shields, 30 and 40, are used to render the N-G detectors 20 and 22 insensitive to the adverse effects of certain other interfering elements with high capture cross-sections for thermal neutrons which may be present in the earth formations and borehole component.

Since, according to prior art, if the borehole component and earth formation are both a constant, the neutron flux in the vicinity of detectors spaced differently in distance from the neutron source will differ in proportion, then the population of neutrons to be thermalized in the vicinity of those detectors will differ accordingly. Also, according to prior art, since neutron capture cannot significantly occur without neutron thermalization, then the resultant aggregate capture gamma radiation spectrum as sampled by substantially identical and shielded but differently spaced N-G detectors will be proportionally representative in intensity since the contributing elements are the same. Thus, the proportionality of this intensity between the Hydrogen and Chlorine energy ranges of one N-G detector as compared to the Hydrogen and Chlorine energy ranges of the other N-G detector would reflect the difference in the neutron flux. But, according to prior art, if the borehole component is constant and the earth formations change, relative to porosity, salinity, and/or matrix material, then the neutron flux in the vicinity of the detectors spaced differently in distance from the neutron source will differ along with an accompanying change in the neutron population to be thermalized. And, subsequently, the resultant intensity of the aggregate capture gamma radiation spectrum as sampled by each of the substantially identical and shielded but differently spaced N-G detectors would change in some like proportional relationship. This proportional change in intensity would reflect the change in the earth formations and more specifically a function of which earth formation factor or factors (porosity, salinity, and/or matrix material) changed. By utilizing the detected change in gamma intensity of Hydrogen Near, Chlorine Near, Hydrogen Far, and Chlorine Far, a differentiation can be constructed as to which of the earth formation factors (porosity, salinity, and/or matrix material) caused the change. This would allow for improvements in distinguishing between hydrocarbons and saltwater contained in the pores of an earth formation traversed by a borehole in accordance with the aforementioned patents and, additionally, distinguish changes in lithology (matrix) relative to the aforementioned fluid differentiation.

Turning again to FIG. 1, the neutron source 16 is seen mounted below a neutron shield 18 that prevents emitted neutrons from traveling directly upward and contaminating the detector readings. The shield 18 does not affect neutrons traveling toward the earth formations. The shield 18 may be composed of lead, tungsten, boron, or a combination of one or more of these elements.

Figure 3:
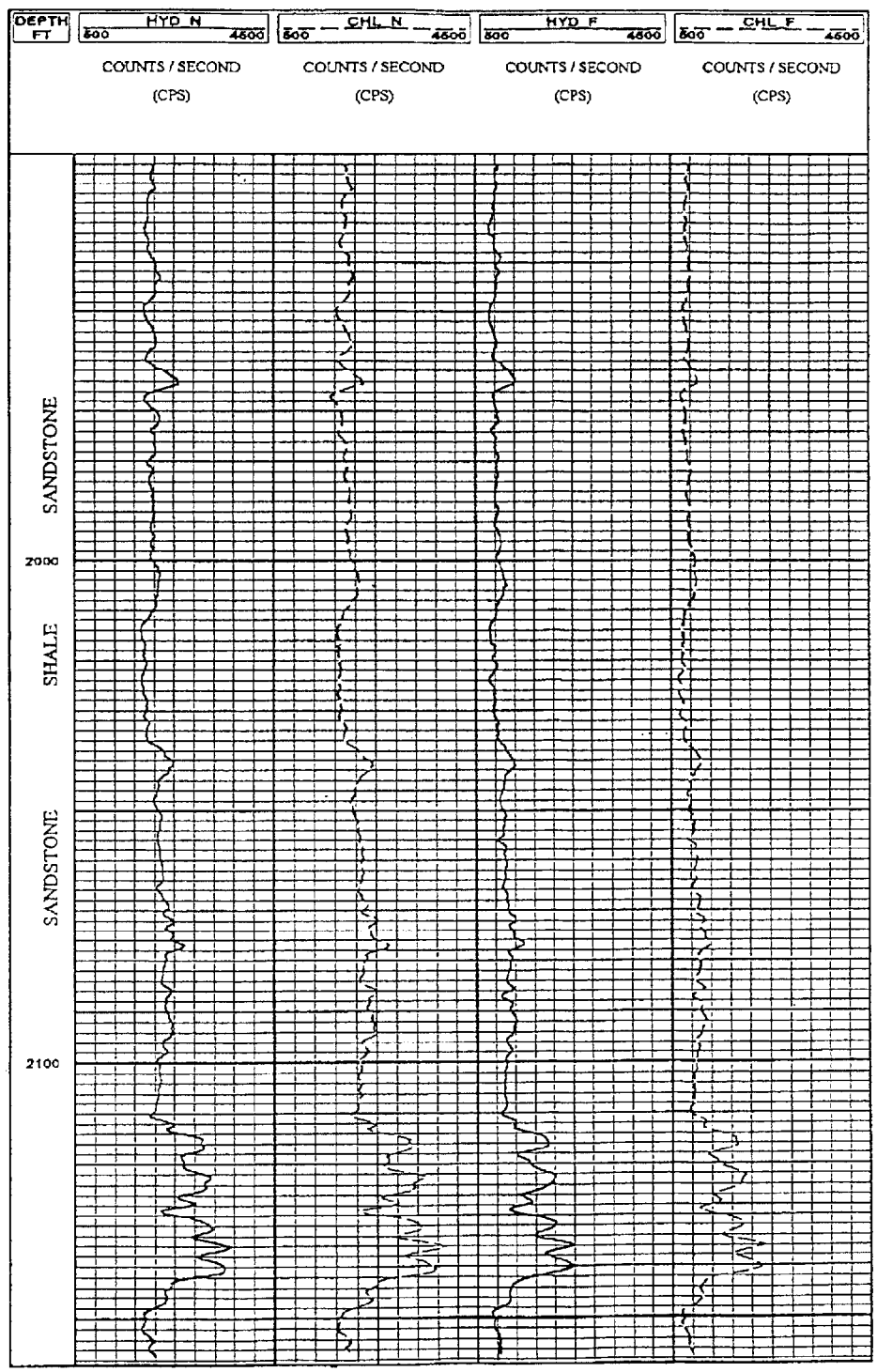
FIG. 3 is a log format record of the data that may be made in accordance with this invention.

Mounted above the neutron shield 18, at different predetermined distances, and within the Dewar flask 14, is a pair of substantially identical Neutron-Gamma detectors 20 and 22 having substantially identical function and operation, each having a scintillation crystal 24 and 34, a photomultiplier tube 26 and 36 with a surrounding anti-magnetic shield 32 and 42, and an electronic unit 28 and 38. In each N-G detector 20 and 22, the photomultiplier tube 26 and 36 convert light energies produce by the scintillation crystal 24 and 34 being struck by capture gamma radiation (photons), from the earth formations, into equivalent and proportional electrical voltages that are processed by the electrical unit 28 and 38. The resultant electrical voltages from each of the N-G detectors 20 and 22 are equivalent and proportional (amount or number) to the actual capture gamma radiation energies that struck each of the N-G detectors 20 and 22. The electrical unit 28 and 38 of each N-G detector 20 and 22 further separates and proportions the equivalent electrical voltages for predetermined capture gamma energy ranges for the aforementioned Hydrogen and Chlorine. The equivalent and proportional electrical voltages for each HYD_N, CHL_N, HYD_F, and CHL_F, corresponding to the amount and energies of capture gamma radiation that struck the N-G detectors 20 and 22 in their respective energy ranges, are sent to a microprocessor 44 and stored to a memory circuit 46 in a form of data as a function of time. This data could then be transmitted and recorded to the surface using one or more techniques common in prior art in accordance with neutron well logging. For this preferred embodiment, the data is obtained from the memory circuit 46 when the tool 10 is retrieved from the borehole. The data is then merged with a memorized depth record as a function of time, recorded at the surface, of the tool when it was in the borehole. This relationship (data/time versus depth/time=data/depth) permits the data to be presented in a log format, such as FIG. 3, as a rate of occurrence, in units of counts per second (CPS), versus depth, in units of feet or meters.

Turning once again to FIG. 1, the tool 10 further comprises a heat sink 50 mounted above the N-G detector 22 within the Dewar flask. The heat sink 50 maintains constant temperature over a finite time period within the Dewar flask 14, which along with the pressure resistant housing 12 facilitates control of the temperature and pressure within the tool 10. This is important because temperature and pressure increase as the tool 10 is lowered into the borehole.

Further, mounted in the pressure housing 12 within the Dewar flask 14 is an electronic assembly 52 that controls and regulates power distribution to the electronic units 28 and 38, as well as the N-G detectors 20 and 22. The electronic assembly also contains the aforementioned microprocessor 44 and the memory circuit 46. The electronic assembly 52 uses a voltage feedback loop to adjust voltage regulation to the N-G detectors 20 and 22 relative to a known radioactive energy of a crystal specific doping internal to the scintillation crystals 24 and 34. This function allows the microprocessor 44 to track and maintain the equivalent voltage, from the N-G detectors 20 and 22, corresponding to the radioactive energy from the doping of the crystals 24 and 34 at its proper energy emission. This insures the spectral integrity of the N-G detectors 20 and 22 to sample the aggregate capture gamma spectrum from the earth formations at their proper energies as temperature changes internally in the tool 10 as it is lowered into the borehole.

Furthermore, the electronic assembly 52 may be powered by a conducting cable from the source of electricity on the surface or by an independent power source, such as a battery pack 48, which was selected for this preferred embodiment. Similarly, the electronic assembly 52 can be powered utilizing a down-hole mud motor or turbine generator with coil tubing and measurement while drilling (MWD) or logging while drilling (LWD) systems. Also, mud pulsed telemetry techniques common to these systems could be used to transmit the data of HYD_N, CHL_N, HYD_F, and CHL_F for above-the-surface recording.

The two proportioned energy ranges of the aggregate spectrum for both the Near N-G detector 20 and the Far N-G detector 22, in FIG. 1, were calibrated with respect to source 16 to detectors 20 and 22 spacing so that with a nominal borehole component across a sandstone and shale sequence the observed capture gamma intensity (i.e. rate of occurrence) in each energy range for the Near N-G detector 20, would be roughly one to one or balanced for HYD_N and CHL_N; and the observed capture gamma intensity (i.e. rate of occurrence) in each energy range for the Far N-G detector 22 would be roughly one to one or balanced for HYD_F and CHL_F. This was done with respect to the functionality of the shields 30 and 40 in accordance to the guidelines set down in the aforementioned U.S. Pat. No. 3,772,513.

Turning again to FIG. 3, because of this balance in intensity, using the same rate of occurrence scales for HYD_N (Track 1) and CHL_N (Track 2) in log format presentation, maintains a proportional curve response across sandstone and shale sequences between HYD_N and CHL_N. Likewise, using the same rate of occurrence scales for HYD_F (Track 3) and CHL_F (Track 4) in log format presentation, maintains a proportional curve response across sandstone and shale sequences between HYD_F and CHL_F.

Figure 4:
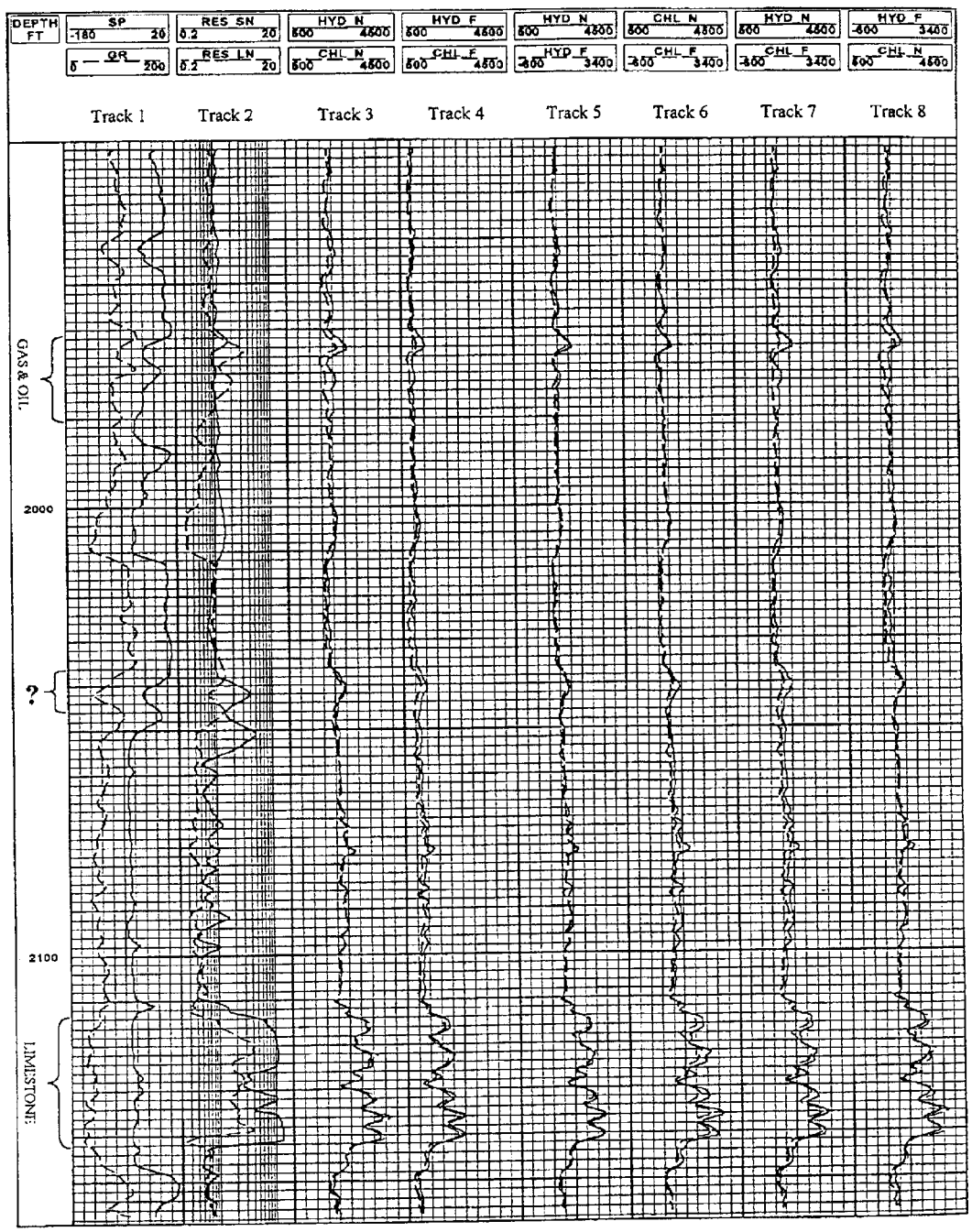
FIG. 4 is a log format record of the data in accordance with the invention combined in overlay presentation compared to available open-hole logging data.
Figure 5:
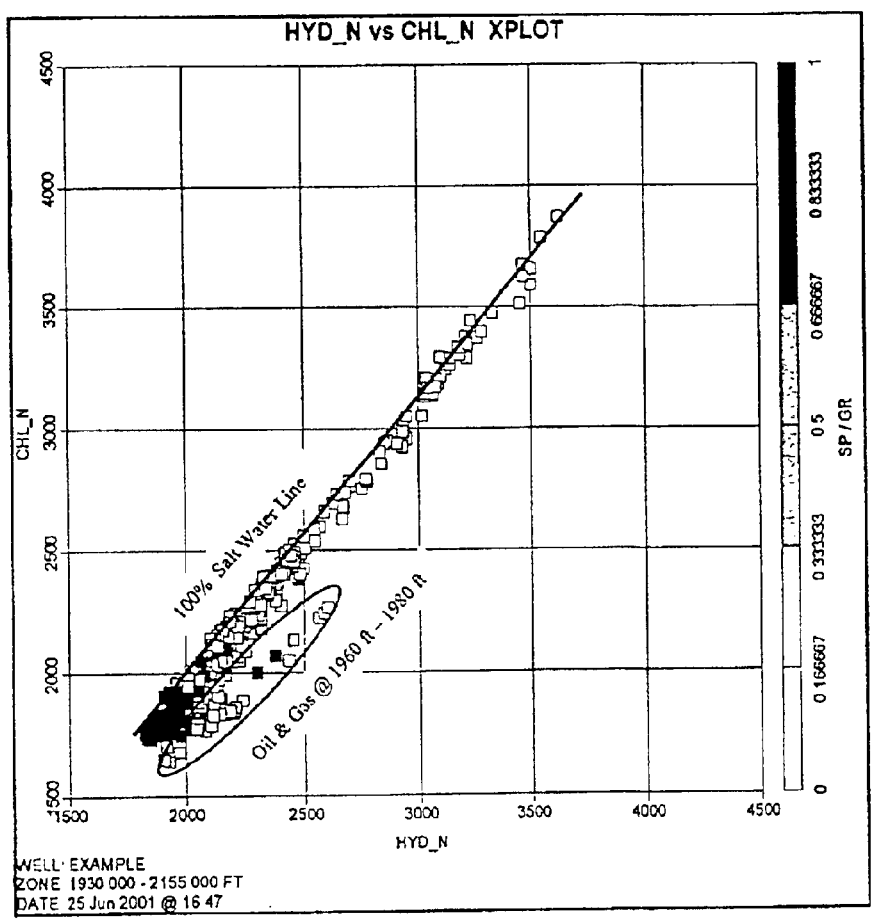
FIG. 5 is a graphical plot (cross-plot) illustrating a procedure for the interpretation of the data obtained in accordance with this invention according to prior art.

Turning now to FIG. 4, HYD_N and CHL_N (Track 3) can be overlaid or compared in the same log format track using the same rate of occurrence scaling. In accordance with prior art, HYD_N and CHL_N should overlay or track in shales and porous saline water sandstones. When correlated to open hole log data (Tracks 1 & 2), an apparent lack in CHL_N intensity as compared to that of HYD_N at 1960 feet to 1980 feet is an indication of a lack of salt water due to the presence of hydrocarbon (i.e. fluid change). The same overlay comparisons for HYD_F and CHL_F (Track 4) can be made. In accordance with prior art, the comparison of HYD_N and CHL_N can also be graphically plotted, as in FIG. 5, and water saturation values calculated. The same comparison for HYD_F and CHL_F can be graphically plotted (not shown) and water saturation values also calculated.

Turning again to FIG. 4, additional relationships between HYD_N and HYD_F (Track 5), CHL_N and CHL_F (Track 6), HYD_N and CHL_F (Track 7), HYD_F and CHL_N (Track 8) can also be presented by a proportional scale shift in the rate of occurrence for the energy range components of the Far N-G detector 20 (FIG. 1) to those of the Near N-G detector 22 (FIG. 1). These relationships are a comparison of the respective energy ranges of the component parts of the aggregate spectrum from substantially identical and shielded but differently spaced N-G detectors 20 and 22 (FIG. 1) relative to a change in neutron flux with the borehole component constant.

In FIG. 4, the overlay of the proportional rates of occurrence for HYD_N and HYD_F (Track 5) intensities are nearly identical. This proportional consistency in the HYD_N and HYD_F curve overlay not only occurs in the shales and porous saline water sandstones but also continues through the limestone interval at 2112 feet to 2142 feet as well as the hydrocarbon bearing sandstone at 1960 feet to 1980 feet. Relative to a change in neutron flux due to an absence or presence of chlorine in an earth formation, this is the desired and expected result due to the functionality of the shields 30 and 40, in FIG. 1, in accordance with U.S. Pat. No. 3,772,513. Thus, the intensity of the neutron flux does not appreciable affect the proportional response of the Hydrogen or formation reference signals between the two substantially identical and shielded but differently spaced N-G detectors 20 and 22, relative to the neutron source 16, irregardless of changes in the earth formations (porosity, salinity, and/or matrix).

Furthermore, in FIG. 4, the overlay of the proportional rates of occurrence for CHL_N and CHL_F (Track 6) intensities are nearly identical in shale and porous sandstones but also are proportionally different in the limestone interval at 2112 feet to 2142 feet? This response is relative to the fact that the neutralizing aspects of the shields 30 and 40 in FIG. 1, in accordance with the aforementioned patent, have little or no effect on the Chlorine or formation reference signal plus chlorine signal of both the Near N-G detector 20 and the Far N-G detector 22; then both Chlorine signals for the substantially identical and shielded but differently spaced N-G detectors 20 and 22 will respond in a conventional manner with a change in the neutron flux relative to one another. Since the intensity of the neutron flux in the vicinity of the Far N-G detector 22 is less than that of the Near N-G detector 20, then the capture gamma intensity in the Chlorine energy range of the Far N-G detector 22 is proportionally less in intensity than that of the Chlorine energy range of the Near N-G detector 20. But since the Chlorine energy ranges of both the N-G detectors 20 and 22 were calibrated to their respected Hydrogen energy ranges in sandstone and shale sequences to achieve an intensity balance, then their proportional intensity responses will remain relatively consistent to one another as long as the neutron flux changes due to sandstone and shale matrix changes. If another type of matrix is encountered such as the limestone, then CHL_F will respond with less proportional intensity than CHL_N since the neutron flux intensity is less in the vicinity of the Far N-G detector 22 than that of the Near N-G detector 20. This response is observed in FIG. 4 across the limestone interval at 2112 feet to 2142 feet relative to the sandstone and shale sequences above.

Also in FIG. 4, in view of the proportional relationships between HYD_N and HYD_F (Track 5) along with that of CHL_N and CHL_F (Track 6), the proportional comparisons and relationships between HYD_N and CHL_F (Track 7) and that of HYD_F and CHL_N (Track 8) could be considered in the same manner as that of HYD_N and CHL_N (Track 3) and that of HYD_F and CHL_F (Track 4). This includes graphical plots (not shown) and water saturation values calculated in accordance with prior art.

Furthermore, turning to FIG. 6, by normalizing or proportionally weighting CHL_N to HYD_N to produce CHL_NN, and normalizing or proportionally weighting CHL_F to HYD_F to produce CHL_FN, an enhanced interpretation of the data is achieved. This proportional weighting completes the balancing of the calibrated intensities (values) of HYD_N to CHL_N and HYD_F to CHL_F in sandstone and shale sequences in order to eliminate any borehole component or formation inconsistency in the tool 10 response.

Figure 7:
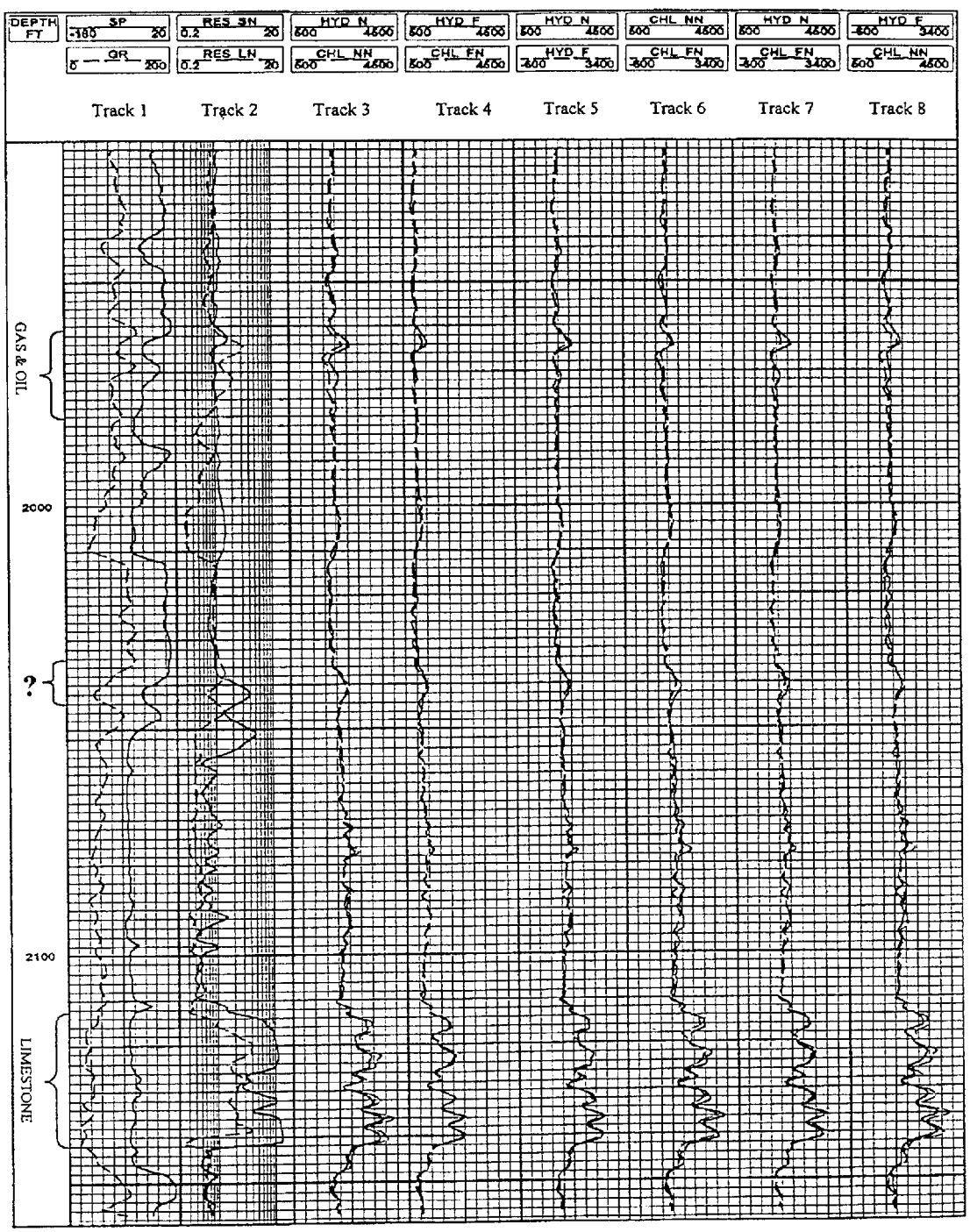
FIG. 7 is a log format record of the normalized data in accordance with the invention combined in overlay presentation compared to available open-hole logging data.
Figure 8:
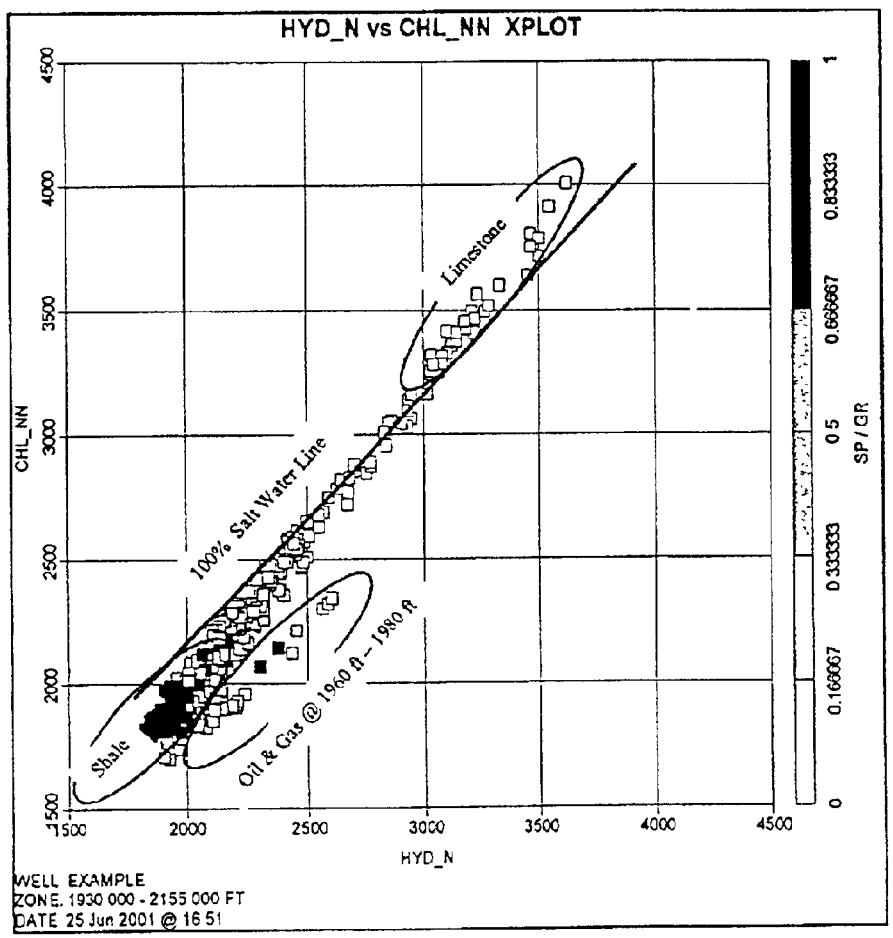
FIG. 8 is a graphical plot (cross-plot) illustrating fluid and matrix material (lithology) differentiation utilizing the normalized data obtained in accordance with the invention.

In turning to FIG. 7, all of the same proportional comparisons and relationships made with HYD_N, CHL_N, HYD_F, and CHL_F, in FIG. 4, can be made with HYD_N and CHL_NN, HYD_F, and CHL_FN. All the respective proportional relationships when presented in log format more precisely overlay or track one another in the sandstone and shale sequences with the only significant curve differentiation occurring as a result of hydrocarbon presence or matrix change. Graphical plots of these respective proportional relationships can be generated such as that of HYD_N and CHL_NN in FIG. 8 to be evaluated in a one to one perspective (slope=1) for hydrocarbon and matrix differentiation in accordance with prior art.

Figure 9:
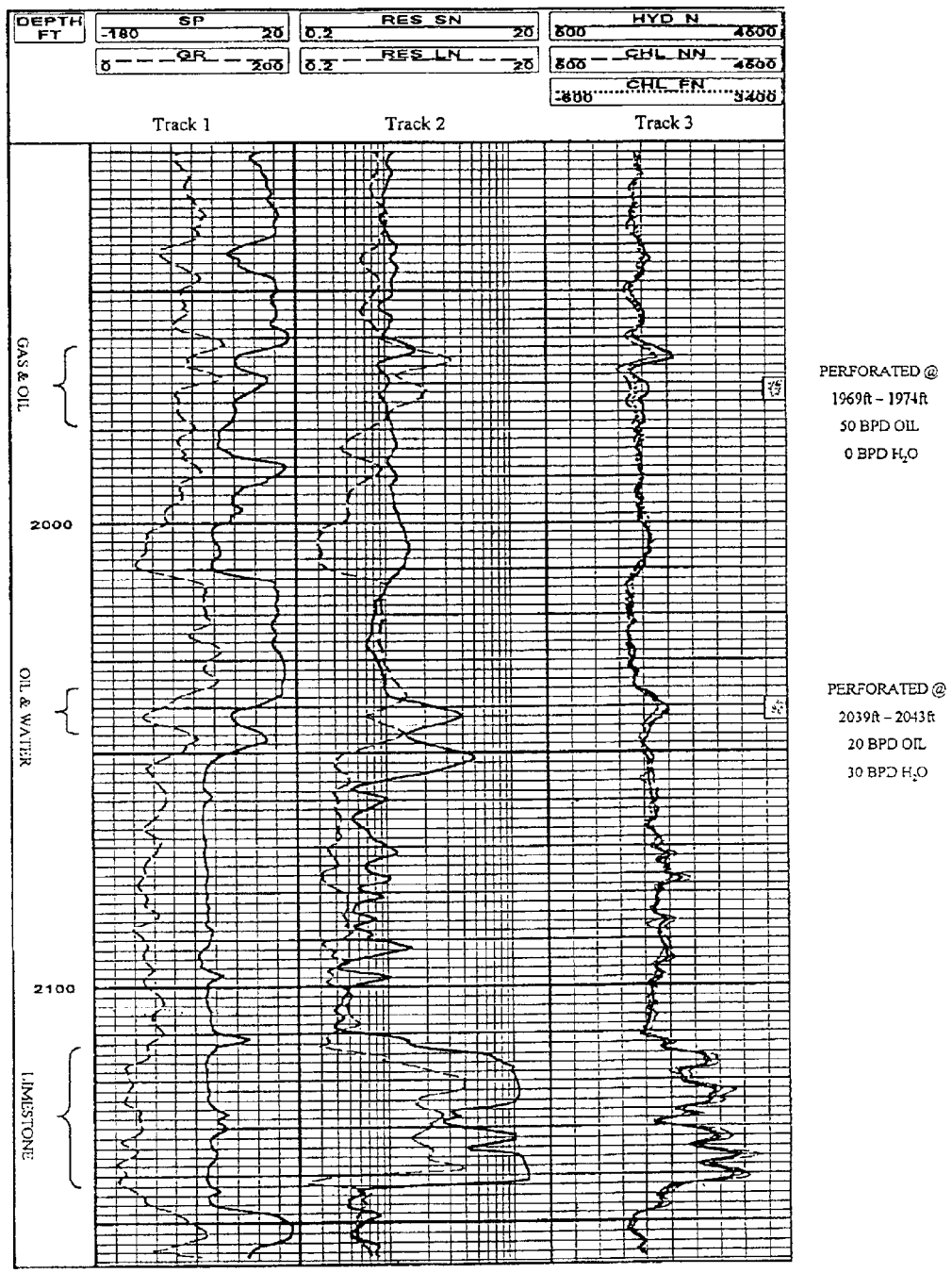
FIG. 9 is a log format record of selected combinations of normalized data in accordance with the invention compared to available open-hole data with perforated and tested depth intervals (production results).

Finally, in FIG. 9, a combination of several of these proportional relationships of this preferred embodiment such as HYD_N and CHL_NN, HYD_N and CHL_FN, and CHL_NN and CHL_FN were presented in Track 3 of a log format and compared to open-hole data presented in Tracks 1 and 2. HYD_N and CHL_NN were presented on the same rate of occurrence scale with CHL_FN presented with a proportional scale shift so that all three representative curves (i.e. proportional intensities) would overlay or track in porous saline water sandstone and shale sequences. This corresponds to the interpretation of the open-hole data in Track 1 and 2. The depth interval from 2112 feet to 2142 feet was characterized as having a proportional intensity increase in the CHL_NN curve as to that of the CHL_FN and the HYD_N curves. This is indicative of a matrix change from the sandstone and shale sequences above this interval. Also, due to no noticeable decrease in proportional intensity response of CHL_FN to that of HYD_N, this change in matrix was determined to be non-producible. The open-hole data across the same depth interval along with open-hole core samples in this interval identify this to be a very low porous saline water limestone formation. The depth interval from 2038 feet to 2046 feet was interpreted as a water bearing sandstone from the open-hole data in Tracks 1 and 2 but since the proportional intensity response of the CHL_FN curve was noticeably less than that of the HYD_N and CHL_NN, the interval was perforated from 2039 feet to 2043 feet and tested. The interval produced hydrocarbons (oil) with a high water cut. The depth interval from 1960 feet to 1980 feet was interpreted as hydrocarbon bearing sandstones from the corresponding open-hole data in Tracks 1 and 2 and additional open-hole core samples. The apparent lack of proportional intensity of the CHL_NN curve to that of CHL_FN curve and then both the CHL_NN and CHL_FN curves to that of HYD_N curve were definite indications of hydrocarbon. The interval was perforated from 1969 feet to 1974 feet and tested. The interval produced hydrocarbons (oil) with no water cut.

I claim:
1. An apparatus for conducting well logging, comprising:
a housing for lowering into a borehole;
a source of neutrons for irradiating borehole surrounding formations;
a first detector mounted in said housing at a first pre-selected distance above said neutron source, said first detector for detecting a first set of signals of capture gamma rays emitted by the irradiated formation indicative of hydrogen and insensitive to chlorine content of the formation, and a second set of signals indicative of both hydrogen and chlorine content of the formation;

a first detector shield surrounding said first detector, said first detector shield being constructed from a lanthanide series rare earth metal and characterized by having a significant thermal neutron induced capture gamma radiation energy response within the first set of signals;

a second detector mounted in said housing at a second pre-selected distance above said first detector, said second detector for detecting a third set of signals of capture gamma rays emitted by the irradiated formation indicative of hydrogen and insensitive to chlorine content of the formation, and a fourth set of signals indicative of both hydrogen and chlorine content of the formation; and a second detector shield surrounding said second detector, said second detector shield being constructed from a lanthanide series rare earth metal and characterized by having a significant thermal neutron induced capture gamma radiation energy response within the third set of signals.

2. The apparatus of claim 1, further comprising a means mounted in said housing for processing and storing said first, second, third and fourth sets of signals.

3. The apparatus of claim 1, wherein each of said first and said second detectors comprises a scintillation crystal using a radioactive dopant.

4. The apparatus of claim 3, wherein each of said first and said second detectors further comprises a photomultiplier tube for converting light energy produced by the scintillation crystal in response to capture gamma radiation from the irradiated formation.

5. The apparatus of claim 4, wherein each of said first and said second detectors further comprises an antimagnetic shield surrounding said photomultiplier tube.

6. The apparatus of claim 3, further comprising a means for regulating power supplied to said first and said second detectors and adjusting said power radioactive doping of said scintillation crystals so as to ensure the spectral integrity of said first and said second detectors in detecting an aggregate capture gamma spectrum of the formation.

7. The apparatus of claim 1, further comprising a means for regulating temperature within said housing.

8. The apparatus of claim 7, wherein said means for regulating temperature is a heat sink mounted above said second detector.

9. The apparatus of claim 1, further comprising a neutron shield mounted between said neutron source and said first detector for preventing interference with capture gamma ray radiation emitted by irradiated formation and detected by said first detector and said second detector.

10. The apparatus of claim 1, further comprising:
a first means for subsequently separating and proportioning the first and second sets of signals;
a second means for subsequently separating and proportioning the third and fourth sets of signals; and
a third means for comparing data generated by said first and said second means.

11. The apparatus of claim 1, wherein the first and second shields are constructed from samarium.

12. An apparatus for conducting well logging, comprising:
a pressure-resistant housing for lowering into a borehole;

a source of neutrons mounted in a lower portion of the housing for irradiating a formation surrounding the borehole and generating a neutron flux adjacent to said housing;

a first detector mounted in said housing at a first pre-selected distance above said neutron source, said first detector for detecting a first set of signals of capture gamma rays emitted by the irradiated formation at a depth corresponding to a position of said first detector indicative of hydrogen and insensitive to chlorine content of the formation, and a second set of signals indicative of both hydrogen and chlorine content of the formation;

a first detector shield surrounding said first detector, said first detector shield being constructed from a lanthanide series rare earth metal and characterized by having a significant thermal neutron induced capture gamma radiation energy response within the first set of signals;

a first means subsequently separating and proportioning the first and second sets of signals;

a second detector mounted in said housing at a second pre-selected distance above said first detector, said second detector for detecting a third set of signals of capture gamma rays emitted by the irradiated formation at a depth corresponding to a position of said second detector indicative of hydrogen and insensitive to chlorine content of the formation, and a fourth set of signals indicative of both hydrogen and chlorine content of the formation;

a second detector shield surrounding said second detector, said second detector shield being constructed from a lanthanide series rare earth metal and characterized by having a significant thermal neutron induced capture gamma radiation energy response within the third set of signals;

a second means subsequently separating and proportioning the third and fourth sets of signals; and a third means for comparing data generated by said first and said second means.

13. The apparatus of claim 12, further comprising a microprocessor mounted in said housing for processing and storing said first, second, third and fourth sets of signals.

14. The apparatus of claim 12, wherein each of said first and said second detectors comprises a scintillation crystal using a radioactive dopant.

15. The apparatus of claim 14, wherein each of said first and said second detectors further comprises a photomultiplier tube for converting light energy produced by the scintillation crystal in response to capture gamma radiation from the irradiated formation.

16. The apparatus of claim 14, further comprising a means for regulating power supplied to said first and said second detectors and adjusting said power relative to radioactive doping of said scintillation crystals so as to ensure the spectral integrity of said first and said second detectors in detecting an aggregate capture gamma spectrum of the formation.

17. The apparatus of claim 12, wherein the first and second shields are constructed from samarium.

18. A method of logging a well for the presence of hydrogen and chlorine in a formation surrounding a borehole, the method comprising:
irradiating formation surrounding the borehole with neutrons;
detecting an aggregate capture gamma radiation spectrum from the formation surrounding the borehole at two vertically apart locations, wherein the intensity of the aggregate capture gamma radiation spectrum is changed at each location by a significant thermal neutron induced capture gamma radiation energy response of a lanthanide series rare earth shield at each location;

generating a first set of signals within a first predetermined energy range and indicative of hydrogen in the formation surrounding the borehole, from the changed spectrum, at a first of said spaced-apart locations;

generating a second set of signals within a predetermined second energy range and indicative of both hydrogen and chlorine in the formation surrounding the borehole, from the changed spectrum, at the first of said spaced-apart locations;

generating a third set of signals within the first predetermined energy range and indicative of hydrogen in the formation surrounding the borehole, from the changed spectrum, at a second of said spaced-apart locations;

generating a fourth set of signals within the predetermined second energy range and indicative of both hydrogen and chlorine in the formation surrounding the borehole, from the changed spectrums at the second of said spaced-apart locations;

comparing said first and said third sets of signals to determine a proportional change in the indicative hydrogen of the formation surrounding the borehole; and comparing said second and said fourth sets of signals to determine a proportional change in both the indicative hydrogen and chlorine of the formation surrounding the borehole.

19. The method of claim 18, wherein said first, said second, said third and said fourth sets of signals are equivalent and proportional to the detected, changed capture gamma radiation spectrum.

20. An apparatus for conducting well logging, comprising:

a housing for lowering into a borehole;

a source of neutrons for irradiating borehole surrounding formations;

a first detector mounted in said housing at a first pre-selected distance above said neutron source, said first detector for detecting a first set of signals within a first energy range and a second set of signals within a second energy range, said first detector comprising:

a first detector shield surrounding said first detector, said first detector shield being constructed from a lanthanide series rare earth metal and characterized by having a significant thermal neutron induced capture gamma radiation energy response within the first set of signals; and a second detector mounted in said housing at a second pre-selected distance above said first detector, said second detector for detecting a third set of signals within the first energy range and a fourth set of signals within the second energy range, said second detector comprising:

a second detector shield surrounding said second detector, said second detector shield being constructed from a lanthanide series rare earth metal and characterized by having a significant thermal neutron induced capture gamma radiation energy response within the third set of signals.

* * * * *